3,271,279
ELECTRODEPOSITION OF COPPER FROM CHROMIUM-CONTAINING SOLUTION
John G. Poor, Otisco, N.Y., assignor to Allied Chemical Corporation, New York, N.Y., a corporation of New York
No Drawing. Filed June 18, 1962, Ser. No. 202,969
10 Claims. (Cl. 204—108)

This invention is a novel method for recovering metallic copper and acid values from waste dichromate pickling solutions. The pickling of copper and of high-copper alloys in chromic acid-sulfuric acid solutions is very widely practiced and in many instances is in large scale operation. Extensive use is also made of pickling solutions comprising dichromate or chromic acid with sulfuric acid for stripping (dissolving) copper from printed circuit boards.

While the useful life of a pickling or stripping solution can be prolonged somewhat by making appropriate additions of chromic and/or sulfuric acids, a point usually is eventually reached where the solution must be withdrawn from further service. Such a point is reached, for example, when the solution contains up to about 100 grams per liter (g.p.l.) of copper. Although there is a wide variation in the pickling solutions discarded from various copper treatment operations in the United States, the spent solution generally contains a large amount of chromium, say about 50 to 150 grams per liter, which is present in both the hexavalent and trivalent forms. Some free sulfuric acid, perhaps about 10 to 175 or 200 grams per liter, and sodium are usually left in the solution and such metals as zinc, nickel and iron may be present in relatively small amounts, but in any event do not substantially affect by their presence the copper recovery techniques of this invention.

Although the electrolytic recovery of copper from spent sulfuric acid pickling solutions is quite old and well established, this practice has not involved solutions containing an appreciable amount, for example, more than about a fraction of a gram, certainly no more than a few grams per liter, of dissolved chromium. A number of attempts have been made to deposit copper-chromium alloys from chromic acid-type solutions, but these attempts generally have proven to be unsuccessful. Chemical recovery methods have been explored, but the quality of the by-products obtained in regenerating the solution have usually been so poor that most attempts have been abandoned as lacking economic feasibility. In one scheme for dealing with spent dichromate-sulfuric acid liquor, a slight excess of sodium carbonate is added and the solution is boiled. This causes precipitation of cupric oxide which can be filtered off and some sodium chromate may be obtained from the filtrate. In another method, scrap iron is added to the solution which causes precipitation of metallic copper by a displacement reaction.

Also, a method has been described by E. E. Lindsey, Jr., in "The Electrolytic Regeneration of Strong Chromate Waste Pickle Liquor From Brass Mills," a thesis in the Yale University Library, New Haven, Connecticut, whereby electrolysis is employed for removing copper and regenerating chromic acid values in the solution. This proposed method, however, fails to recover all the copper values from the waste solution in the most usable form.

The practice of this invention enables the recovery from these pickling solutions of substantial amounts, or even essentially all, of the dissolved copper values as a high purity, tough, ductile metal sheet or film, free from the "burned" or powdery, dark colored, characteristics of electro-deposited copper which is contaminated with oxides and other co-deposited impurities. The process of this invention comprises subjecting to electrolysis in the cathode chamber of a diphragm cell a waste pickling solution containing more than about 20 g.p.l. of copper, while exercising control over the current density, temperature and degree of agitation of the solution. During the early part of copper deposition, while the copper content of the solution is usually above about 20 g.p.l., the current density will generally be above about 10 or 15 amperes per square foot (a.s.f.), for greatest savings in time; as the copper content is depleted the current density is preferably reduced until, when the copper content, during the latter stage of deposition reaches about 5 g.p.l., the current density has been reduced to no more than about 5 a.s.f. in order to keep the high quality of the copper deposit while operating at more than 30° C. and good electrode efficiency. Frequently, it will be preferable to reduce the current density to 5 a.s.f. when the copper content is about 10 g.p.l. and to reduce the current density below about 2.5 a.s.f. when the copper content is below about 5 g.p.l. During copper deposition the waste pickling solution contains at least about 50, often about 50 to 150 g.p.l. of dissolved chromium, measured as $CrO_3$, no more than about 10 g.p.l. of which is in the hexavalent form. The solution also contains at least about 25 g.p.l. of sulfuric acid. The temperature employed during copper deposition is usually about 30 to 75° C.

Usually the solution will contain about 20–75 g.p.l. of dissolved copper and good results are obtained when the free acid ranges up to as much as 70 grams per liter and considerably more than this may be permissible, for instance, up to about 200 g.p.l. or even more. The solution preferably contains about 50 to 150 g.p.l. sulfuric acid. The chromium content is often in the range of about 75 to 110 g.p.l. and preferably no more than about 5 g.p.l. of the chromium is in the hexavalent state.

The waste pickling solution is used as the catholyte of an electrolysis cell and high purity copper is deposited on the cathode of the electrolysis system. Simultaneously with the copper deposition, the process of this invention may provide for regeneration of the chromic acid values in the anolyte chamber.

The current density, temperature and degree of agitation employed are dependent upon each other and upon the amount of copper in the solution. In general, higher temperatures and greater agitation enable a higher current density to be employed without giving a burned deposit, thus speeding the copper deposition. Generally, the cathode current density during the early part of copper deposition may be high, say in the range of about 10 to 35 a.s.f. and as metal recovery continues and the copper content of the solution is depleted, the cathode current density may be progressively lower and will be in the range of about 1 to 5 a.s.f. as the solution reaches depletion in copper. Some maximum current densities, in order to secure a good copper product at various copper levels in the pickling solution at two different temperatures and the same degree of agitation are given in Table I below.

TABLE I
Catholyte Temperature

| 52° C. ±1° | | 35° C. ±1° | |
|---|---|---|---|
| Copper (gms. per liter) | Current density (amps. per sq. ft.) | Copper (gms. per liter) | Current density (amps. per sq. ft.) |
| 30–60 | 30 | 30–60 | 20 |
| 15–30 | 20 | 15–30 | 10 |
| 5–15 | 10 | 10–15 | 5 |
| <5 | 5 | <10 | 2.5 |

Temperatures ranging from about room temperature to almost the boiling point of the solution may be employed but temperatures in the range of about 30 to 70° C., advantageously about 40 to 60° C. are preferred to insure proper pickling solution regeneration. As can be seen from the above table, higher temperatures permit higher current densities to be used, at least in the early stages, thus speeding the process, without harming the copper deposit. Where no agitation of the catholyte is used, the limiting cathode current density is usually too low to be commercially feasible. Higher rates of solution movement permit an increase in the current density used in copper plating. Preferably, the agitation is sufficient to pass at least about 8 inches of the solution per minute over the cathode surface.

The cathode employed for copper plating may be one of a number of materials, for example, copper or some other metal that will not be corroded and cause contamination of the solution, but 18–8 stainless steel is generally found to be most advantageous because the deposited copper film or plate can be readily removed from it. It is very desirable that the cathode member have a large effective surface area relative to its bulk and permit free passage of solution over its surface. When sufficient copper has been deposited on the cathode so that it may be removed as a fairly smooth sheet or film, say of about 0.007 to 0.125 inch in thickness, the cathode may be replaced. Above this thickness, deposits may tend to be rough and nodular, but usually they still will be entirely coherent and of good color. While thickness itself is not ordinarily an important consideration in the easy reuse of the copper, these surface qualities may be.

When the copper content of the waste pickling solution is so low that further recovery attempts are impractical, for example, less than about 5 g.p.l., preferably less than about 3 g.p.l., the solution is removed from contact with the cathode and may be subjected to anodic current in order to convert trivalent chromium to hexavalent chromium which appears as $Cr_2O_7^=$ ions in an acid medium, thereby putting the pickling solution in condition once more for use. The anode material preferably is lead or a high lead alloy and a sufficient anode area is provided to give the desired anode current density. Some indication has been found that oxidation efficiency in the anolyte may be greater using an antimonial lead anode than when using chemically pure or unalloyed lead. The anode current density can be varied to a considerable extent ranging, for example, from about 15 to 40 or more amperes per square foot, but for maximum oxidation efficiency should be, for example, about 20–35 amperes per square foot.

The copper deposition and the hexavalent chromium regeneration are advantageously performed simultaneously in the same cell. A porous diaphragm is used to separate the copper-rich catholyte from the copper-depleted anolyte. This diaphragm prevents mixture of the solutions but usually allows migration of ions from the catholyte to the anolyte. Such rigid, water-wettable materials as porcelain and asbestos paper impregnated with silicic acid, having pores in the range of about 1 to 2 microns may be employed. The pore size and thickness of the diaphragm should not be such as to involve a voltage drop or electrical resistance of too high a value from the practical operating standpoint. The apparatus employed for concurrent copper recovery and pickling solution regeneration may advantageously comprise a tank having a lead or other acid-resistant lining divided into two compartments by the the porcelain or other diaphragm. A sheet-metal anode and a sheet metal cathode are placed in the compartments with generous clearance. The sheet metal may be rolled to form a cylinder if space in these compartments is limited. Each compartment is provided with an agitating means, preferably a mechanical stirrer or pump.

At the beginning of processing, while copper is being plated out at the cathode an aqueous conductive sulfate material, such as dilute sulfuric acid, say about one normal, can be used as the anolyte until copper-depleted pickling solution is available, which the can be transferred to the anolyte chamber. Adjustments in the current density to suit each of the reactions may be achieved by regulating the size of the electrodes. The volume of anolyte and catholyte is preferably maintained constant and also, since there is migration of sulfuric ions from the catholyte to the anolyte, sulfuric acid is generally added to the catholyte to keep more than about 25 grams per liter of free sulfuric acid in the catholyte. The anodic treatment of the copper-depleted waste solution is generally continued until a fresh pickling solution of the desired strength is produced. Such a solution contains, for example, about 200 to 500 g.p.l. free $H_2SO_4$ and about 75 to 150 g.p.l. of chromium measured as $CrO_3$, at least about 70% or even 90% or more of which is in the hexavalent, dichromate form. This regenerated liquor has been found to be quite normal in its behavior from the pickling standpoint.

Waste solutions from commercial copper pickling operations are generally not suitable for immediate use in copper recovery according to the method of this invention. Such waste solutions generally contain a substantial amount of hexavalent chromium, frequently ranging from about 25 to 75% of the total 50 to 150 g.p.l. total chromium. This must be reduced to less than about 10 grams per liter, preferably to less than about 5 grams per liter, of hexavalent chromium measured as $CrO_3$ before it can be subjected to electrolysis to produce a directly useable copper product. Therefore, as the first step in a complete processing system, excess hexavalent chromium in the spent solution is reduced to the trivalent condition.

Chemical reducing agents may be employed for this reduction of hexavalent chromium. Sulfur dioxide, sucrose or even blackstrap molasses may be used for this reduction but more preferably, to avoid possible contamination of the solution, hydrogen peroxide is added to the waste solution from copper pickling. Enough of this reagent is usually added to bring the hexavalent chromium to the desired level of less than about 10 or 5 g.p.l., but any excess added may be easily boiled off.

Preferably, however, the reduction of hexavalent chromium is performed by electrolyzing the solution in the catholyte chamber of a diaphragm-type cell, perhaps the same cell as used for copper deposition. Some free sulfuric acid, at least about 25 g.p.l. must be present during the reduction, and feed solutions usually will require adjustment in this respect. Preferably the solution is adjusted before treatment to an acidity level such that the 25 g.p.l. free sulfuric acid minimum will be present after the reduction of hexavalent chromium is completed.

An important feature of this invention is the use of low current densities for reduction of hexavalent chromium. Where higher current densities are employed a deposition of low-grade copper occurs along with chromate reduction, wasting a portion of this recoverable value. To avoid this concurrent deposition of low grade copper, the cathode current density is kept low, preferably below about 5 a.s.f., and the solution is heated and rather vigorously agitated. The temperatures used for electrolytic reduction are advantageously the same as those employed in copper plating, and the current densities are low, for example, about 1 to 5 amperes per square foot of cathode surface, advantageously about 2.5 a.s.f. When this method of reduction is employed, the electrolysis at low current density is preferably continued until the hexavalent chromium has been lowered to about 5 g.p.l. or less. Once more, sulfate materials such as dilute sulfuric acid may be used as the anolyte during the chromium reduction, especially until enough copper-depleted solution is available to serve as the anolyte. The cathode material during the reduction step may be the type described above but since it is very desirable that the cathode member have a large effective surface area relative to its bulk, while not needing the strippable characteristics of the cathode for copper deposition, very satisfactory cathodes can be made of perforated stainless steel sheet or of stainless steel wire screen.

Thus, in this invention, waste pickling solution may be adjusted in its content of free sulfuric acid and placed in the catholyte chamber of the electrolytic cell where it may be subjected to a low cathodic current, that is, below about 5 a.s.f., until the level of hexavalent chromium is below about 5 g.p.l. Then the electrolysis can be further performed at a higher current density while plating out copper, for example, about 20 a.s.f., depending on copper concentration, temperature, etc., with or without a change from a screen or perforated cathode to a sheet cathode.

Continuing the electrolysis at increased current density reduces substantially all remaining hexavalent chromium with concurrent deposition of high quality copper. By contrast, if the initial reduction of chromium is attempted at about 10 a.s.f. or higher, that is, if large current densities are applied before reduction of the hexavalent chromium large amounts of powdery, impure copper may be immediately deposited and wasted. Low bath temperatures also tend to cause deposition of low grade copper early during the reduction step. Agitation during reduction is advantageously the same as for copper plating. Concentrations of hexavalent chromium of less than about 10 grams per liter measured as $CrO_3$ are conveniently approximated during the late stages of reduction by measuring the redox potential of the solution. Of course, the hexavalent chromium may be reduced in a different cell from that used for copper deposition when desired.

Advantageously, commercial exploitation of this invention may comprise putting the waste pickling liquor in the catholyte chamber of an electrolysis cell having a screen or perforated cathode and passing a current of low density through the solution until the hexavalent chromium has been reduced to the extent needed, replacing the cathode with a sheet cathode and passing current at a higher density through the catholyte, reducing the density as the copper in the solution is depleted until the copper is substantially removed from the catholyte, removing the copper-lean solution and the sheet cathode from the catholyte chamber and putting a new batch of copper-rich waste pickling solution in the catholyte chamber along with a perforated cathode and repeating the process, the regenerated solution in the anolyte chamber being used for further pickling. The process may, of course, be run in continuous or semi-continuous manner.

*Examples*

The following examples of the process of this invention are to be considered illustrative only and not limiting.

*Example I*

A synthetic spent stripping solution was made up by dissolving 60 grams per liter of copper metal in an aqueous solution containing 125 g.p.l. of chromic acid ($CrO_3$) and 350 g.p.l of sulfuric acid. The calculated composition of the resulting solution was approximately as follows:

| | G.p.l. |
|---|---|
| $Cr^{+6}$ (as $CrO_3$) | 62 |
| $Cr_2(SO_4)_3$ | 123 |
| $CuSO_4$ | 151 |
| $H_2SO_4$ | 165 |

To one liter of this synthetic spent solution, 205 ml. of 30% aqueous $H_2O_2$ were added with stirring. This treatment reduced substantially all of the hexavalent chromium content. The solution was then boiled to remove excess $H_2O_2$.

This reduced solution, containing about 60 grams available copper, was put into the catholyte chamber of an electrolytic cell, a 1500 ml. beaker having a cylindrical stainless steel cathode with 0.44 of a square foot of surface, a centrally disposed cylindrical lead anode, and a Coor's porcelain cup diaphragm approximately 6" deep with a 2" diameter, suspended about ¾" above the bottom of the beaker and having an average pore diameter of one to two microns. 1 normal aqueous sulfuric acid was put into the porous cup (anolyte chamber) and the cell and its contained liquids were held at 32° C. during the electrolysis. A magnetic stirring device was operated in the clearance between diaphragm and the beaker. Electrolysis was carried out in two parts, the first of which had the following schedule:

| Time (hrs.) | Current (amp.) | Amp. hours | Approx. cathode current density (a.s.f.) |
|---|---|---|---|
| 3 | 8.7 | 26.1 | 20 |
| 3 | 4.5 | 13.5 | 10 |
| 1.75 | 2.2 | 3.85 | 5 |

Having passed a total of 43.5 ampere hours of current in this first part of the electrolysis, weight measurements showed that 51 grams of copper had been deposited. This yield corresponded with a cathode metal efficiency of about 99%. The concentration of copper in the catholyte solution having been lowered to about 9 g.p.l., the second part of the electrolysis was conducted by passing a current of 1.1 amperes, equivalent to a cathode current density of 2.5 a.s.f., for a period of 6 hours. During this second period of electrolysis in which 6.6 ampere hours of current passed, the weight of copper deposited was nearly 8 grams. Altogether, more than 98% of the available copper in the solution was recovered. The copper deposit was entirely coherent and in readily usable form.

Further runs were conducted using pickle liquor waste from commercial copper treating operations. Solutions C and A are described in Table II below.

TABLE II

| | Solution C, g.p.l. | Solution A, g.p.l. |
|---|---|---|
| Quantitative Wet Analysis: | | |
| $Cr^{+6}$ calc. as $CrO_3$ | 38.8 | 30.1 |
| $Cr^{+3}$ calc. as $CrO_3$ | 57.6 | 44 |
| Cu | 44.7 | 58.0 |
| Free Acid, as $H_2SO_4$ | 24 | 37 |
| | Est. g.p.l. | Est. g.p.l. |
| Spectrographic Analysis: | | |
| Al | 0.05-0.1 | <0.01 |
| Na | 200-500 | 100-500 |
| Fe | 0.1-0.5 | 0.4-0.8 |
| Ni | 5-10 | 8-15 |
| Pb | 0.005-0.01 | 0.08-0.2 |
| Mg | 0.001-0.005 | 0.003-0.008 |
| Mn | 0.02-0.05 | 0.5-1 |
| Si | <0.01 | 0.01-0.05 |
| Zn | 10-20 | 10-20 |
| V | 0.001-0.01 | Not detected |
| Ca | 0.01-0.03 | 0.01-0.5 |
| Ba | 0.001 | Not detected |
| Sr | Not detected | Not detected |
| Sb | Not detected | Not detected |
| Ti | Not detected | Not detected |
| Sn | <0.1-0.5 | 0.08-0.2 |
| Cd | Not detected | Not detected |

*Example II*

About one liter of solution C described above was placed in the catholyte chamber of the apparatus described in Example I. About 2 N $H_2SO_4$ was used in the anolyte chamber. The catholyte solution was subjected to three successive periods of electrolysis. In the first period, with the temperature varying from about 52° C. to 60° C., the catholyte was subjected to 36 a.s.f. of current for 2 hours. A black, spongy deposit of copper occurred from the start, despite the presence of almost 25 g.p.l. of free sulfuric acid in the solution at the start. This acid content lessened as the run progressed. In the second period the catholyte was subjected to 16 a.s.f. current at about 52° C. for 1.3 hours. Some metallic copper was obtained, but further black spongy material also deposited. In the third stage a fresh stainless steel sheet cathode was employed in the bath at about 52° C. A 16 a.s.f. current was applied for three hours and then a 10 a.s.f. current for 1.3 more hours. A rough low-grade deposit of copper was obtained. This run demonstrates the bad and wasteful effect of using excessively high cathode current densities during electro-reduction of hexavalent chromium.

*Example III*

In this example the apparatus employed the same anode, anolyte and diaphragm arrangement as previously described. The cell was contained in an inverted, unstoppered, 4-liter plastic bottle from which the bottom had been cut. This closely fitted the outside of the cylindrical cathode and the whole assembly was submerged in a large reservoir of the feed catholyte solution. A pump was used to maintain continuous circulation of solution from the outside reservoir and through the annular cell section. Rough measurements indicated that the total cell volume was being displaced in about 30 seconds and that solution moved across the cathode at an average velocity of at least 8" per minute.

A double thickness of stainless steel wire screen having an actual surface area of about 2 ft. was used as cathode during reduction of hexavalent chromium and, based on this surface area, the current density used was 2.5 a.s.f. About 37.85 liters of solution C were circulated in the catholyte reservoir. 1 N $H_2SO_4$ was used as the anolyte. Having applied the number of ampere hours of current calculated to be needed for reduction of the hexavalent chromium to less than 5 g.p.l. at about 2.5 a.s.f. current density, it was found that copper was still being deposited at the cathode in loose, powdery, unusuable form. Analysis showed the hexavalent chromium was higher than expected (9.9 g.p.l. calculated as $CrO_3$) and that the concentration of free sulfuric acid was only about 11 g.p.l. showing a need for greater than 25 g.p.l. free $H_2SO_4$ during electrolytic reduction.

while 1 liter of solution was being electrolyzed in the catholyte chamber. In run number V, the entire volume of anolyte feed solution was slowly and continuously circulated through the anolyte chamber. These two methods of handling the anolyte feed are convenient when the capacity of the porous cup is limited. Chemical lead and 6% antimonial lead were used as anode materials. For the most part, the anode current density was either 18 a.s.f. or 35 a.s.f. Bath temperature was 52 ±1° C., except in the case of test number IV where equipment failure caused the temperature to drop well below the target range for two or more short periods of time. Details and results of these tests are given in Tables III and IV below.

TABLE III—EXAMPLE IV

Catholyte Volume—1,000 ml.
Anolyte Volume—1,050 ml. (processed in separate 175 ml. portions)
Anode—6% antimonial lead, effective area about 0.13 square feet

CATHOLYTE CONDITIONS AND RESULTS

| Cathode Operation | Reduction of $Cr^{+6}$ to $Cr^{+3}$ | Copper Deposition | |
| --- | --- | --- | --- |
| | | Stage I | Stage II |
| Current density (a.s.f.) | 2.5 | 10 | 5 |
| Ampere hours | 24 | 40.5 | 6.3 |
| Cu remaining in soln (g.p.l.) | 58.0 | 10 | 3.5 |
| Cu recovery | | 52 gms. (90%) | |

ANOLYTE CONDITIONS AND RESULTS

| | | | |
| --- | --- | --- | --- |
| Anode current density (a.s.f.) | 35 | 35 | 35 |
| Ampere hours | 20.25 | 26.25 | 13.5 |
| $Cr^{+6}$ production (gms. $CrO_3$) | 21.8 | 24.9 | 11.7 |
| Percent Cr regeneration | [1] 84.3 | [1] 96 | 90 |
| Percent Anode efficiency | [1] 87 | [1] 76.5 | 70 |

[1] Average of two anolyte batches.

TABLE IV—RUN V

Catholyte Volume—1250 ml
Anolyte Volume—1250 ml
Anode—Chemical lead, effective area about 0.25 ft.[2]

CATHOLYTE CONDITIONS AND RESULTS

| Cathode Operation | Reduction of $Cr^{+6}$ to $Cr^{+3}$ | Copper Deposition | | |
| --- | --- | --- | --- | --- |
| | | State I | State II | State III |
| Cathode current density (a.s.f.) | 2.5 | 10 | 5 | 2.5 |
| Ampere hours | 29.4 | 47.2 | 4.5 | 4.1 |
| Cu remaining in soln. (g.p.l.) | 58 | 16.7 | 11.4 | 6.5 |
| Copper recovery | | 66 gms. (91%) | | |

ANOLYTE CONDITIONS AND RESULTS

| | | | | |
| --- | --- | --- | --- | --- |
| Anode current density (a.s.f.) | 18 | 18 | 9 | 4.5 |
| Ampere hours | 29.4 | 47.2 | 4.5 | 4.1 |
| $Cr^{+6}$ production (gms. $CrO_3$) | 62.5 | 62.5 | 62.5 | 62.5 |
| Percent Cr regeneration | 67.5 | 67.5 | 67.5 | 67.5 |
| Percent Anode efficiency | 59 | 59 | 59 | 59 |
| $H_2SO_4$ production (gms.) | [1] 92 | [1] 92 | [1] 92 | [1] 92 |

[1] An additional 21 gms. $H_2SO_4$ entered the anolyte by migration from the catholyte.

*Examples IV and V*

In a further series of runs, spent commercial liquor A was employed as catholyte. Free acidity of this solution was adjusted to about 73 g.p.l. $H_2SO_4$ and the volume taken for separate runs was varied from 1 to 1.25 liters.

Feed solution to the anolyte chamber consisted of liquor A which had been processed for recovery of copper in earlier runs and this had the following composition:

| | G.p.l. |
| --- | --- |
| $Cr^{+3}$, measured as $CrO_3$ | 74 |
| Cu | 2.3 |
| Free $H_2SO_4$ | 81.5 |

In run number IV, several 175-ml. portions of anolyte feed solution were separately and successively electrolyzed In general, therefore, it is found that regeneration of hexavalent chromium and sulfuric acid in the anolyte is obtained at fairly high current efficiency and that there usually is no difficulty or interference with recovery of copper in the catholyte.

I claim:

1. A method for the plating out of copper from an aqueous solution containing at least about 20 grams per liter of dissolved copper, at least about 50 grams per liter of dissolved chromium, measured as $CrO_3$, no more than about 10 grams per liter of which is in the hexavalent form and at least about 25 grams per liter of free $H_2SO_4$, which comprises subjecting the solution to a cathodic current at a temperature of about 30 to 75° C. while agitating the solution and forming a coherent high purity copper deposit, said plating out being continued until the aqueous solution contains less than about 5 grams per liter of copper, and said cathodic current having a density no greater than about 5 amperes per square foot when the solution contains no more than about 5 grams per liter of dissolved copper.

2. The method of claim 1 in which the current density is no greater than about 5 amperes per square foot when the solution contains less than about 10 grams per liter of dissolved copper.

3. The method of claim 1 in which the current density is no greater than about 2.5 amperes per square foot when the solution contains less than about 5 grams per liter of dissolved copper.

4. A method for the plating out of copper from a solution which comprises subjecting to a cathodic current of a density of about 10 to 35 amperes per square foot, but insufficient to deposit contaminated copper, an aqueous solution containing at least about 20 grams per liter of dissolved copper, at least about 50 grams per liter of dissolved chromium measured as $CrO_3$, no more than about 10 grams per liter of which is in the hexavalent form, and at least about 25 grams per liter of free $H_2SO_4$, at a temperature of about 30 to 75° C. while agitating the solution and forming a coherent high purity copper deposit, said plating out being continued until the aqueous solution contains less than about 5 grams per liter of copper and reducing the current density to no more than about 5 amperes per square foot when the dissolved copper has been reduced to no more than about 5 grams per liter.

5. The method of claim 4 in which the solution contains less than 5 grams per liter of hexavalent chromium.

6. A method for plating out copper from a waste pickling solution which comprises subjecting an aqueous solution containing at least about 20 grams per liter of dissolved copper, at least about 50 grams per liter of dissolved chromium, measured as $CrO_3$, more than 10 grams per liter of which is in the hexavalent form, to reduction to give a solution containing no more than 10 grams per liter of hexavalent chromium, and subjecting the resulting solution, containing at least about 25 grams per liter of free sulfuric acid, to a cathodic current having a density of about 10 to 35 amperes per square foot but insufficient to deposit contaminated copper at a temperature of about 25 to 75° C. while agitating the solution, continuing the cathodic current until the aqueous solution contains less than about 5 grams per liter of copper and reducing the current density to no more than about 5 amperes per square foot when the dissolved copper has been reduced to no more than about 5 grams per liter and forming a coherent high purity copper deposit.

7. The method of claim 6 in which the hexavalent chromium is reduced by a chemical reducing agent to less than about 5 grams per liter.

8. The method of claim 7 in which the agent is $H_2O_2$.

9. The method of claim 6 in which the hexavalent chromium is reduced by subjecting the solution to a cathodic current having a density of about 1 to 10 amperes per square foot in the presence of at least about 25 grams per liter of free sulfuric acid.

10. A method for simultaneous plating out of copper from a waste pickling solution and regeneration of a pickling solution containing hexavalent chromium and sulfuric acid which comprises electrolyzing in the catholyte chamber of an electrolytic cell having an anolyte chamber and a catholyte chamber separated by a porous diaphragm, an aqueous solution containing at least about 50 grams per liter of dissolved chromium, measured as $CrO_3$, no more than about 10 grams per liter of which is in the hexavalent form, and at least about 25 grams per liter of free $H_2SO_4$, at a temperature of about 30 to 75° C., while agitating the solution, said plating out being continued until the aqueous solution contains less than about 5 grams per liter of copper, and said cathodic current having a density no greater than about 5 amperes per square foot when the solution contains no more than about 5 grams per liter of dissolved copper, while electrolyzing in the anolyte chamber an aqueous solution similar to the solution in the catholyte chamber but from which copper has been removed by use in said catholyte chamber and forming a coherent high purity copper deposit.

References Cited by the Examiner

UNITED STATES PATENTS 2,579,551  12/1951  Corsini _____ 204—108
2,792,342  5/1957  Tuwiner _____ 204—108

FOREIGN PATENTS 11,996  6/1908  Great Britain.

OTHER REFERENCES

Bandrowska, Przemyst. Chem., 13: 602–3 (1957) (Chem.) Abst. #52:7087e).

Hallowes, Copper (1959), 5:18–20 (Chem. Abst. #54:24238e).

Jones, "Electrolytic Recovery of Copper and Sulfuric Acid From Copper Mill Pickling Solutions" (paper presented at American Electrochemical Society, October 6, 1917), pages 160–4.

Nikolaev, J. Physc. Chem. (U.S.S.R.), 19:562 (1945) Chem. Abst., #40:3046.

JOHN H. MACK, Primary Examiner.

MURRAY TILLMAN, Examiner.

L. G. WISE, H. M. FLOURNOY, Assistant Examiners.